(12) United States Patent
Burcham et al.

(10) Patent No.: US 6,296,227 B1
(45) Date of Patent: Oct. 2, 2001

(54) VALVE ASSEMBLY WITH CLAMP ON BONNET

(75) Inventors: Gregory S. Burcham, Tucson, AZ (US); Samuel C. Walker, Upland, CA (US)

(73) Assignee: Anthony Manufacturing Corporation Commercial Products Division, Tucson, AZ (US)

( * ) Notice: Subject to any disclaimer, the term of this patent is extended or adjusted under 35 U.S.C. 154(b) by 0 days.

(21) Appl. No.: 09/578,559

(22) Filed: May 24, 2000

(51) Int. Cl.[7] .............................. F16K 31/02; F16K 27/12
(52) U.S. Cl. ........................................ 251/30.03; 251/367
(58) Field of Search .................... 251/367, 30.03, 251/30.02

(56) References Cited

U.S. PATENT DOCUMENTS

| | | | | |
|---|---|---|---|---|
| 2,697,581 | * | 12/1954 | Ray | 251/30.03 |
| 4,606,368 | * | 8/1986 | McCafferty | 137/15 |
| 4,911,401 | * | 3/1990 | Holcomb et al. | 251/30.03 |
| 5,829,477 | * | 11/1998 | Graham et al. | 137/454.2 |

* cited by examiner

*Primary Examiner*—Kevin Lee
(74) *Attorney, Agent, or Firm*—Kelly Bauersfeld Lowry & Kelley, LLP

(57) ABSTRACT

An improved valve assembly having a valve member encased within a valve housing including a bonnet which is removably mounted on a lower or main valve body by one or more clamp members adapted for quick and easy disassembly without tools to facilitate access to the valve housing interior for service or maintenance. In a preferred form, the valve member is carried by a diaphragm for movement between closed and open positions in response to a solenoid actuator, for regulating the pressure within a control chamber acting upon the diaphragm. The clamp member or members are mounted on the housing bonnet for releasible clamp fit engagement with the main valve body. A bleed screw is mounted on the bonnet for selectively bleeding fluid such as air from the control chamber and normally engages and locks the clamp member or members in a position for retaining the bonnet and main valve body in assembled relation. The bleed screw can be retracted or removed from the bonnet to permit clamp member disengagement or disassembly therefrom and corresponding separation of the bonnet from the main valve body.

36 Claims, 11 Drawing Sheets

VALVE ASSEMBLY WITH CLAMP ON BONNET

BACKGROUND OF THE INVENTION

This invention relates generally to improvements in valve units or valve assemblies of the type having a valve member mounted within a valve housing and movable to control fluid flow along a flow path, such as a water supply valve in an irrigation system for supplying water to one or more irrigation sprinklers. More particularly, this invention relates to an improved valve housing construction wherein one or more clamp members are provided for removably retaining valve housing components in a clamp-fit assembled relation. The clamp member or members are adapted for quick and easy disengagement or disassembly from the housing components, preferably without the use of tools, to permit quick and easy access to the interior of the valve housing for periodic service and/or maintenance.

Irrigation sprinkler systems commonly include a water supply valve for controlling the supply of water under pressure to one or more irrigation sprinkler devices which deliver the irrigation water to a surrounding terrain area and associated vegetation. The supply valve generally comprises a valve housing having an inlet for connection to a source of water under pressure, and an outlet for connection via suitable conduits to the associated sprinkler devices. A valve member is mounted within the valve housing for movement between open and closed positions relative to a valve seat for controlled coupling of the water supply to the sprinkler devices. In one common form, the water supply valve may include a remotely operated solenoid actuator for displacing the valve member between the open and closed positions. In addition, the supply valve may incorporate pressure regulation means such as a pressure responsive resilient diaphragm for movably positioning the valve member in a manner to maintain the downstream water pressure at a substantially constant and predetermined pressure level. For one example of a water supply valve of this type, designed primarily for use in irrigation systems, see U.S. Pat. No. 4,226,259.

In such water supply valves, the valve housing is normally constructed from two or more housing components formed from cast metal or molded plastic, and assembled with the associated valve member and resilient diaphragm movably mounted therein. In a typical configuration, the valve housing components are removably assembled by means of multiple mounting screws or bolts, whereby the housing components may be subsequently disassembled for access to the housing interior in the event that service or maintenance is required. Such disassembly of the valve housing, however, has normally required tools for removing the mounting screws or bolts, and has been a relatively time-consuming process which has not been conducive for quick and easy performance at an in-the-field installation site.

The present invention provides an improved housing construction for a water supply valve or the like, wherein valve housing components are retained in assembled relation by one or more clamp members designed for quick and easy removal without the use of tools to accommodate quick and easy access to the housing interior.

SUMMARY OF THE INVENTION

In accordance with the invention, an improved valve assembly is provided with a movable valve member mounted within a valve housing, wherein the valve housing comprises an upper bonnet removably mounted on a lower or main valve body by one or more clamp members. The clamp members are adapted for quick and easy disengagement or disassembly from the valve housing, without the use of tools, to facilitate access to the valve housing interior for service or maintenance.

In a preferred form, the valve assembly includes a valve member carried by a resilient diaphragm for movement between closed and open positions with respect to a valve seat, in response to operation of a solenoid actuator which regulates the pressure within a control chamber acting upon the diaphragm. When the solenoid actuator vents the control chamber to relieve pressure therein, the diaphragm permits movement of the valve member from a normal closed position to an open position permitting flow of fluid such as water through the valve housing. Conversely, when the solenoid actuator closes the control chamber vent, fluid pressure rise within the control chamber acts against and displaces the diaphragm to move the valve member back to the closed position. A bleed port is normally provided in the valve housing bonnet and is selectively opened by a retractable bleed screw or the like to permit selective purging of air from within the control chamber. An exemplary valve assembly of this type is shown and described in U.S. Pat. No. 4,226,259, which is incorporated by reference herein.

The clamp members are mounted on the housing bonnet for releasible clamp fit engagement with the main valve body. A retainer element is removably mounted on the bonnet to engage and retain the clamp members in a normal position retaining the bonnet and main valve body in assembled relation. In the preferred form, the retainer element comprises the bleed screw which can be sufficiently retracted or removed from the bonnet to permit clamp member disengagement or disassembly therefrom and corresponding separation of the bonnet from the main valve body. Such retraction or removal of the bleed screw to release the clamp members is accompanied by water discharge through the bleed port in the event that an associated source or supply of water under pressure has not been turned off at an upstream location, thereby indicating to service personnel that the disassembly process should not proceed until the water supply is turned off.

Other features and advantages of the invention will become more apparent from the following detailed description, taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figure 1:
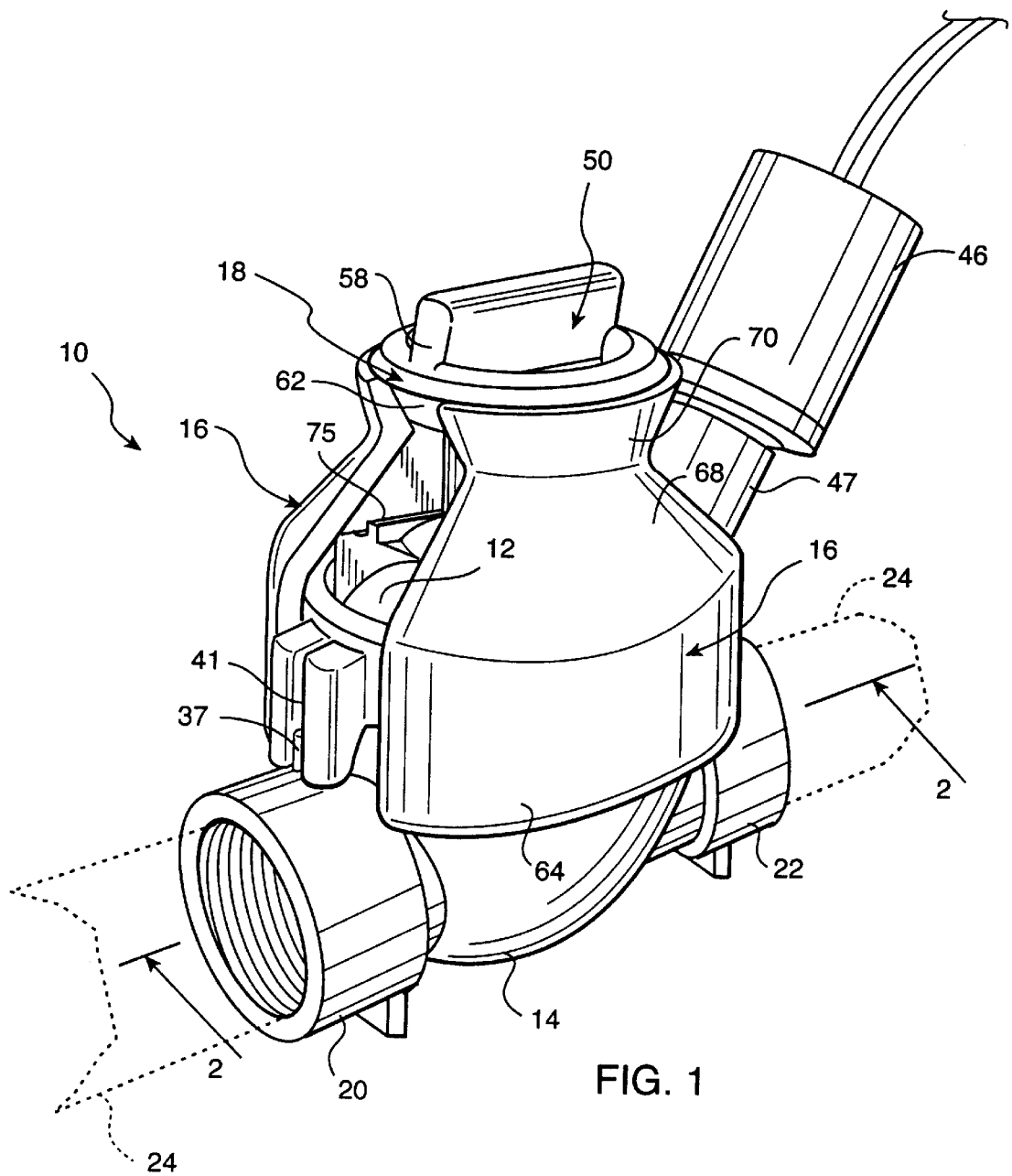
FIG. 1 is a perspective view of a solenoid actuated valve assembly including a clamp on housing bonnet embodying the novel features of the invention.

As shown in the exemplary drawings, an improved valve assembly referred to generally in FIG. 1 by the reference numeral 10 is provided with a valve housing including an upper valve bonnet 12 mounted removably onto a lower or main valve body 14 by at least one and preferably multiple clamp members 16. The clamp members 16 are removably secured by a retainer element 18 in a normal position with the bonnet 12 and main valve body 14 held in assembled relation. However, in the event that access to the interior of the valve housing is desired, such as for service or maintenance, the clamp members 16 may be disengaged or removed quickly and easily without tools to permit lift-off separation of the bonnet 12 from the main valve body 14.

The valve assembly 10 shown in the accompanying drawings generally comprises an on-off supply valve for use in irrigation systems or the like to controllably couple a source or supply of water under pressure to one or more irrigation sprinkler devices which deliver the water in a controlled manner and pattern to a target terrain area and selected vegetation. In this regard, as shown in FIGS. 1–5, the lower or main valve body 14 defines an inlet fitting 20 and an outlet fitting 22 at opposite ends thereof for suitable connection of the valve body 14 in-line along the length of a water supply conduit 24. The interior of the main valve body 14 forms a fluid flow path 26 (FIGS. 2–3) extending from the inlet fitting 20 to the outlet fitting 22, with a valve port 28 defined by a surrounding annular valve seat 30 disposed along the length of this flow path 26 . A valve member 32 is movably carried within the valve assembly 10 for movement between open and closed positions relative to the valve seat 30 for selectively permitting and preventing waterflow through the port 28.

Figure 5:
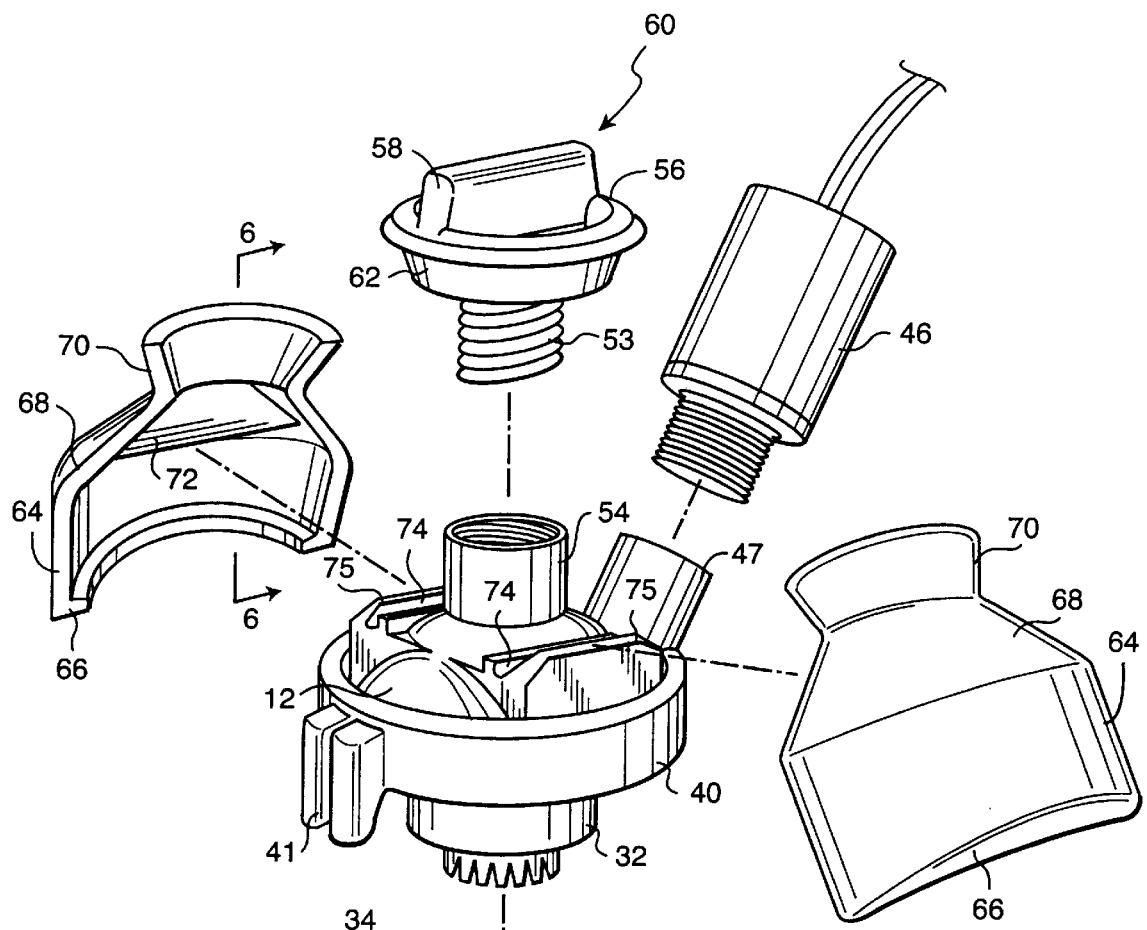
FIG. 5 is an exploded perspective view of the valve assembly of FIG. 1.
Figure 5:
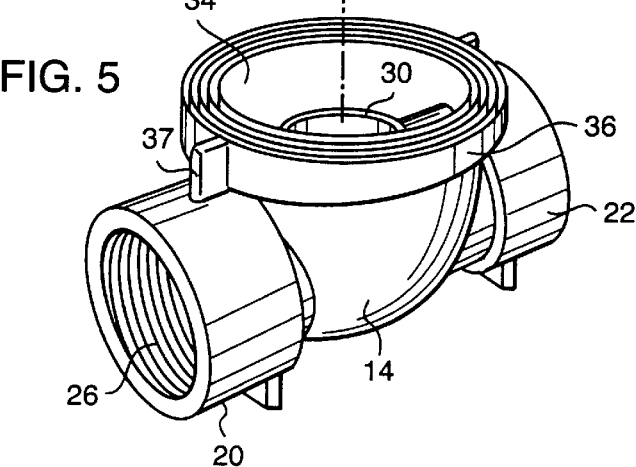

As shown best in FIG. 5, the main valve body 14 includes an upper opening 34 to expose the internal flow path 26 and the associated annular valve seat 30, with a generally circular and outwardly radiating flange 36 circumscribing this opening 34. The valve member 32 is movably carried by a resilient diaphragm 38 (FIGS. 2 and 3) having a periphery thereof captured between the underlying flange 36 and a peripheral rim 40 of the bonnet 12. From its rim 40, the bonnet 12 extends upwardly and radially inwardly with a generally arched or dome-shaped configuration extending in spaced relation over the diaphragm 38, whereby the bonnet 12 and the diaphragm 38 cooperatively define a control chamber 42 (FIGS. 2–3) at an upper side of the diaphragm. A biasing spring 44 is normally provided within the control chamber 42 and reacts between the overlying bonnet 12 and the underlying diaphragm 38 for normally urging the diaphragm 38 downwardly to move the valve member 32 toward a normal closed position (FIG. 2) resting on the valve seat 30. A radially outwardly projecting ear 37 may be formed on the valve body flange 36 for reception into a slot 41 formed on the bonnet rim 40 to insure proper assembled alignment between the bonnet 12 and the main valve body 14.

Figure 2:
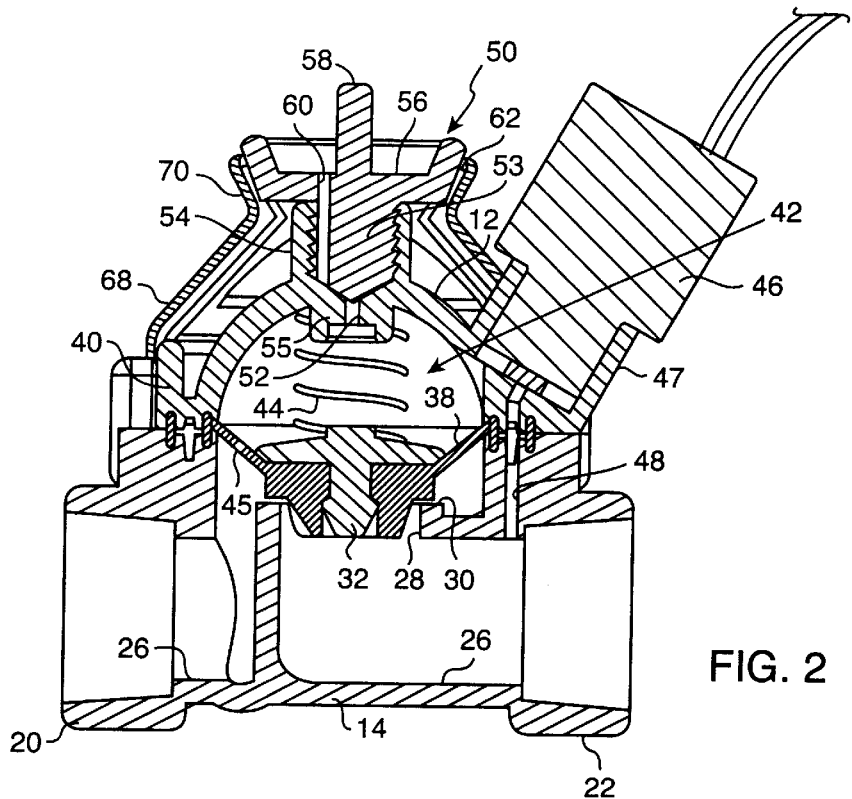
FIG. 2 is a longitudinal vertical sectional view taken generally on the line 2—2 of FIG. 1, and illustrating a valve member in a normal closed position.
Figure 3:
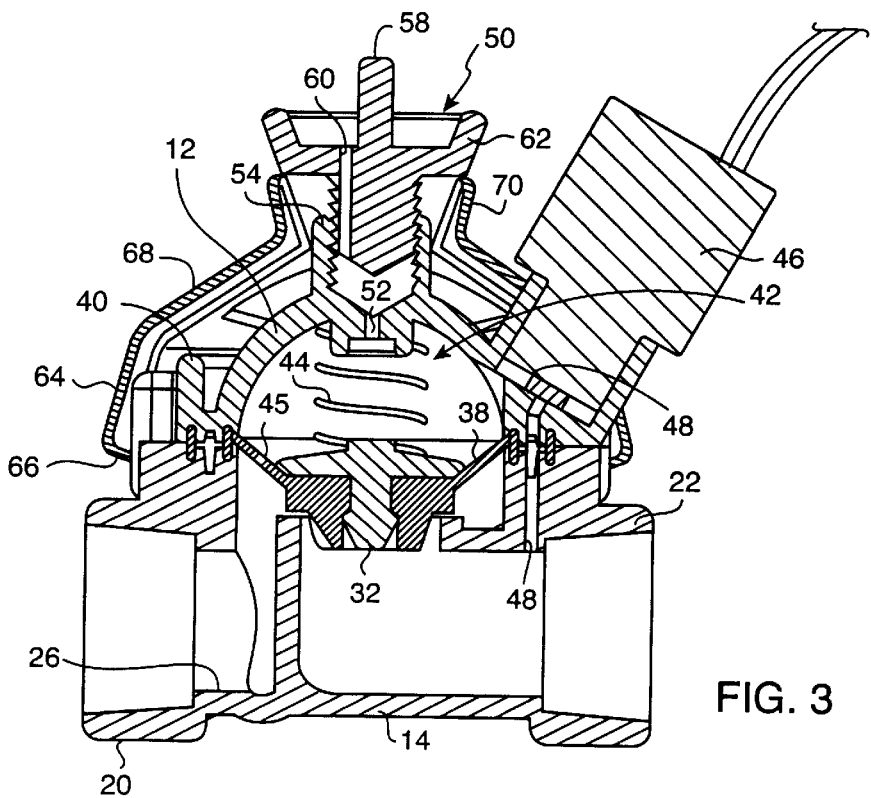
FIG. 3 is a longitudinal vertical sectional view similar to FIG. 2, but depicting disengagement or partial disassembly of the clamp on bonnet from a lower or main valve body.

The fluid pressure level within the control chamber 42 is regulated to control movement of the valve member 32 between the open and closed positions. More particularly, a small inflow orifice 45 (FIGS. 2–3) is formed in the diaphragm 38 for coupling water under pressure at the upstream or inlet fitting side of the valve seat 32 to the control chamber 42. A solenoid actuator 46 is mounted on the bonnet 12 within a threaded socket 47 or the like for controllably venting the control chamber 42 via a vent passage 48 to a low pressure site such as to a point downstream from the valve seat 30. During normal operation of the valve assembly 10, when the solenoid actuator 46 is de-energized to close the vent passage 48 (as shown in FIGS. 2–3), fluid pressure accumulates within the control chamber 42 by relatively slow bleed flow through the inflow orifice 45, and this fluid pressure cooperates with the spring 44 to displace the diaphragm 38 and the valve member 32 carried thereby to the normal position closing the valve port 28. However, when the vent passage 48 is opened, the fluid pressure within the control chamber 42 is sufficiently relieved so that the pressure acting on an exposed annular surface of the diaphragm 38 at the upstream side thereof overcomes the spring force to shift the valve member 32 to an open position relative to the valve seat 30. Such opening of the vent passage 48 takes place by activation of the solenoid actuator 46, which beneficially occurs by remote operation. Subsequent re-closure of the vent passage 48 upon de-energization of the solenoid actuator permits the fluid pressure to accumulate within the control chamber 42 for shifting the diaphragm 38 and valve member 32 back to the normal closed position.

A bleed screw 50 is also mounted on the bonnet 12 for permitting air to be purged from the control chamber 42 via a small bleed port 52 (FIGS. 2–3). The bleed screw 50 comprises a threaded shaft 53 for advancement into an internally threaded boss or sleeve 54 formed at the top of the bonnet 12 and having the bleed port 52 formed therein at a lower end wall 55 thereof. An enlarged head 56 on the bleed screw 50 includes a transverse tab or wing 58 or the like suitable for easy manual grasping for rotatably setting the bleed screw within the threaded boss 54 without requiring tools. In use, the bleed screw 50 is normally advanced to firmly seat a nose or tip end of the threaded shaft 53 against the lower end wall of the boss 54, to close and seal the bleed port 52 (as viewed in FIG. 2). However, partial threaded retraction of the bleed screw 50 relative to the boss 54 (as viewed in FIG. 3) permits fluid flow from the control chamber 42 through the bleed port 52, and further through a bleed slot or aperture 60 formed in the screw shaft 53 to the exterior of the valve assembly 10. Occasional partial retraction of the screw shaft 53 may be required to purge air from the control chamber 42 and thereby insure proper operation of the valve assembly.

Figure 4:
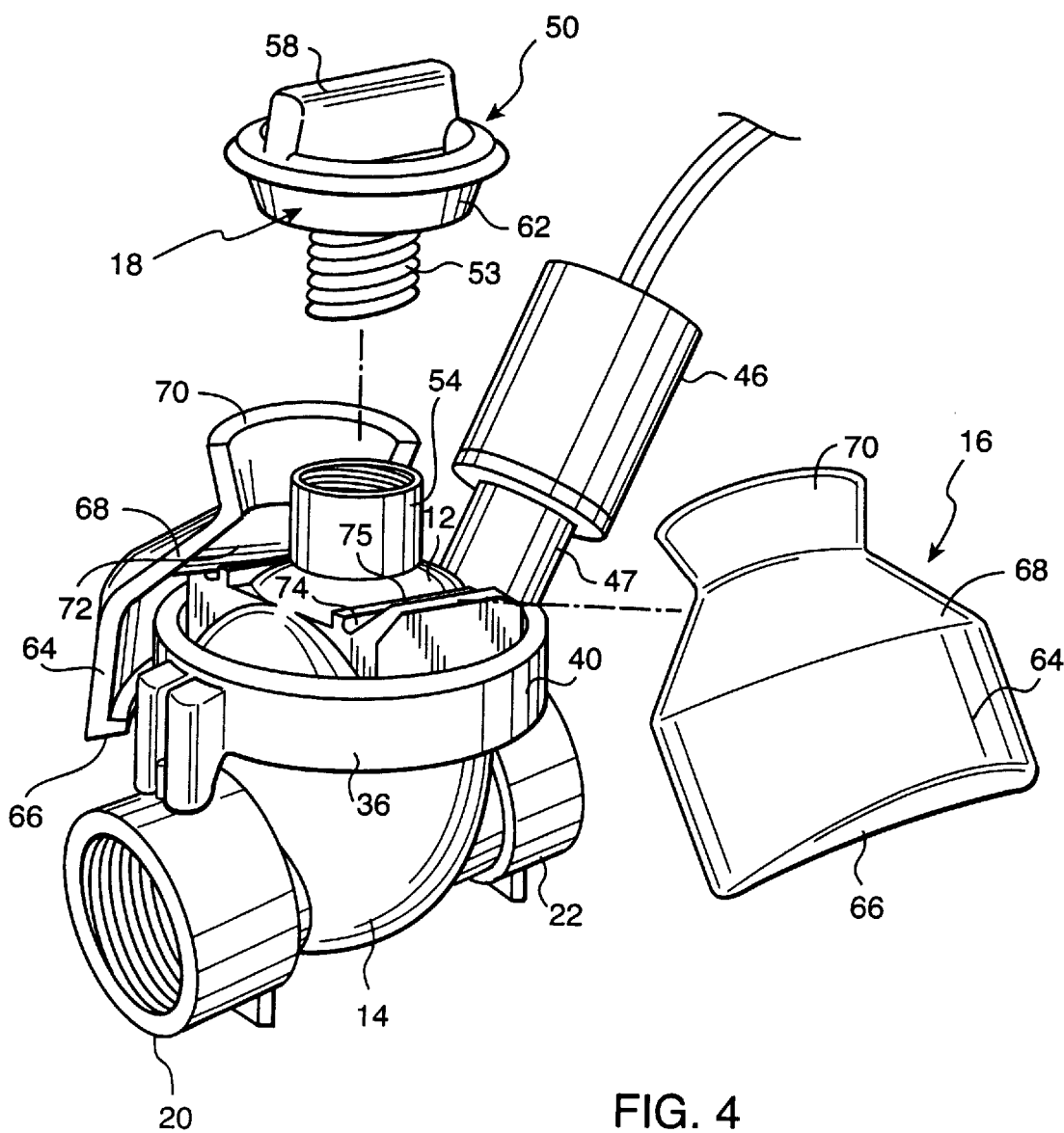
FIG. 4 is a partially exploded perspective view illustrating disassembly of the housing bonnet from the main valve body.

In accordance with the invention, at least one and preferably a plurality of the clamp members 16 are provided for releasibly retaining the upper bonnet 12 and the main valve body 14 is assembled relation. FIGS. 1 and 4–5 shown a pair of generally shell-shaped clamp members 16 removably carried on opposite sides of the valve assembly 10. These clamp members 16 are configured to engage and retain the bonnet 12 and main valve body 14 in assembled relation, yet accommodate quick and easy disengagement or removal without the use of tools to permit simple lift-off separation of the bonnet 12 from the underlying valve body 14 to expose the internal valve components for service and/or maintenance. The head 56 of the bleed screw 50 further includes a radially enlarged and tapered upper cam shoulder 62 forming the retainer element 18 for normally engaging and locking the clamp members 16 in a position with the bonnet and valve body retained in assembled relation.

More specifically, each clamp member 16 includes a part-cylindrical lower and outer shell segment 64 having a size and shape to overlie an external portion of the assembled bonnet 12 and valve body 14. A lower end of this shell segment 64 carries an inwardly radiating lock foot 66 for engaging the underside of the outwardly radiating mounting flange 36 surrounding the upper opening 34 on the valve body 14. From the lock foot 66, the lower shell segment 64 extends upwardly in close-fitting relation about the periphery of the flange 36, and also about the periphery of the rim 40 on the bonnet 12. The lower shell segment 64 of each clamp member 16 merges with a tapered upper shell segment 68 which extends upwardly and radially inwardly in close-fitting relation over the bonnet 12, and terminates in an upper cam segment 70 having a partcircular shape and tapering upwardly and outwardly generally at the upper extent of the threaded bleed screw boss 54. When two of the clamp members 16 are mounted onto opposite sides of the assembled bonnet 12 and valve body 14, they overlie and encircle a substantial portion of the valve bonnet 12 and the peripheral flange 36 of the main or lower valve body 14.

Figure 6:
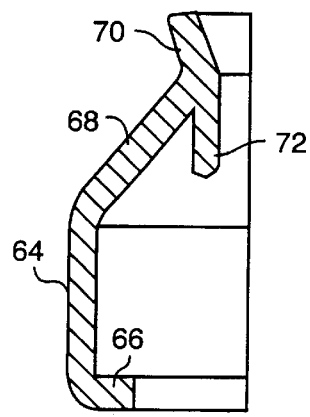
FIG. 6 is an enlarged sectional view taken generally on the line 6—6 of FIG. 5, and showing construction details of a clamp member for removably engaging and retaining the bonnet.

The two clamp members 16 each include an internal hinge rib 72 (shown best in FIGS. 4–6) formed at the inboard side of the tapered upper shell segment 68 and projecting downwardly therefrom. These hinge ribs 72 have a size and shape for respective close-fitting nested reception into matingly shaped and upwardly open hinge channels 74 defined by upstanding ribs 75 formed on opposite sides of the bonnet exterior. That is, each clamp member 16 is mounted onto the assembled bonnet 12 with its hinge rib 72 seated into the associated bonnet channel 74. By forming the hinge ribs 72 and the associated channels 74 to have a mating and substantially linear configuration as shown, each interfitting hinge rib 72 and channel 74 comprises an open-sided hinge to permit pivoting motion of the clamp member 16 relative to an axis defined by the channel 74.

More particularly, when mounted onto the bonnet 12 with its internal hinge rib 72 seated into the associated channel 74, each clamp member 16 can be pivoted about the channel hinge line to swing the lower end thereof radially inwardly to position the lock foot 66 in engagement with the underside of the flange 36 on the valve body 14. Such inward pivoting motion of the lock foot 66 is accompanied by an outward pivoting motion of the upper cam segment 70. In this position, the bleed screw 50 can be threadably advanced into the boss 54 to position the tapered cam shoulder 62 in bearing engagement with an interior surface of the cam segment 70 (shown best in FIGS. 1–2). Importantly, in this position, the cam segment 70 forms the retainer element 18 to prevent inward pivoting motion of the cam segment 70, and thereby to correspondingly prevent outward disengagement of the lower lock foot 66 from the flange 36 on the main valve body 14. In addition, the cam shoulder 62 blocks against upward displacement of the clamp member 16 and its associated hinge rib 72 relative to the bonnet channel 74, thereby preventing separation of the internal hinge rib 72 from the bonnet channel 74. Accordingly, the cam shoulder 62 on the bleed screw 50 engages and locks the cam segments 70 of the two clamp members 16 in a position retaining the bonnet 12 and the underlying main valve body 14 in fully and securely assembled relation. However, when it is desired to disassemble the bonnet 12 from the main valve body 14 to gain access to the interior of the valve housing, the bleed screw 50 can be removed or preferably retracted without removal from the bonnet 12 by simple thread-off displacement without requiring the use of tools. The enlarged tab 58 on the head 56 of the bleed screw 50 accommodates easy manual grasping for threaded removal from the threaded bonnet boss 54. Such retraction of the bleed screw 50 is accompanied by fluid (air and/or water) discharge via the bleed port 52, in the event that a supply source of water under pressure has not previously been turned off at a suitable upstream location. Accordingly, initial bleed screw retraction provides an indication to service personnel that further disassembly should not proceed until the water supply source has been turned off.

Retraction or removal of the bleed screw 50 from the bonnet 12 permits the cam segment 70 at the upper end of each clamp member 16 to be displaced radially inwardly toward the boss 54 sufficiently to pivot the lower lock foot 66 radially outwardly for disengagement from the flange 36 on the main valve body 14 (FIGS. 3–4). In this regard, sufficient retraction of the bleed screw 50 to permit this disengagement, without removal of the bleed screw, is preferred since the clamp members 16 are retained in assembled relation with the bonnet 12 to reduce risk of the clamps being misplaced and lost. In this regard, such partial retraction of the bleed screw 50 retains each clamp member 16 with its internal hinge rib 72 pivotally engaged with the associated bonnet channel 74, while permitting sufficient outward pivoting of the lower lock foot 66 for disengagement from the main valve body flange 36. Alternately, the bleed screw 50 can be removed from the threaded boss 54, in which case each clamp member 16 can be separated entirely from the bonnet 14 by simple lift-off movement to separate the internal hinge rib 72 from the associated bonnet channel 74. In each case, with the lower lock feet 66 of the clamp members 16 disengaged from the main valve body 14, the bonnet 12 can also be separated from the underlying main valve body 14 by simple lift-off movement. This exposes the interior of the valve body 14 for appropriate inspection, service or maintenance. In addition, the diaphragm 38 and the associated valve member 32 may be inspected, repaired, or replaced. Re-assembly occurs quickly and easily, again without requiring tools, by simple drop-fit installation of the bonnet 12 onto the valve body 14. The clamp members 16 are then re-oriented with their lower lock feet 66 re-engaged with the flange 36 on the valve body 14. The bleed screw 50 is then re-tightened to re-position the tapered cam shoulder 62 thereon to engage and retain the clamp members 16 in a position retaining the bonnet 12 and valve body 14 in fully assembled relation.

An alternative preferred form of the invention is shown in FIGS. 7–11, wherein modified clamp members 116 are provided for removably retaining a modified upper bonnet 112 in assembled relation with a lower or main valve body 14 which may be constructed according to the embodiment of FIGS. 1–6. In general, FIGS. 7–11 show a plurality of four clamp members 116 carried on the bonnet 112 and normally engaged and locked in position by an upper retainer element 118 in the form of a threaded lock nut 150, for retaining the bonnet 112 and main valve body 14 in fully and securely assembled relation. For ease and clarity of description, structural components corresponding in function to those shown and described in FIGS. 1–6 are referred to by common reference numerals increased by 100.

Figure 7:
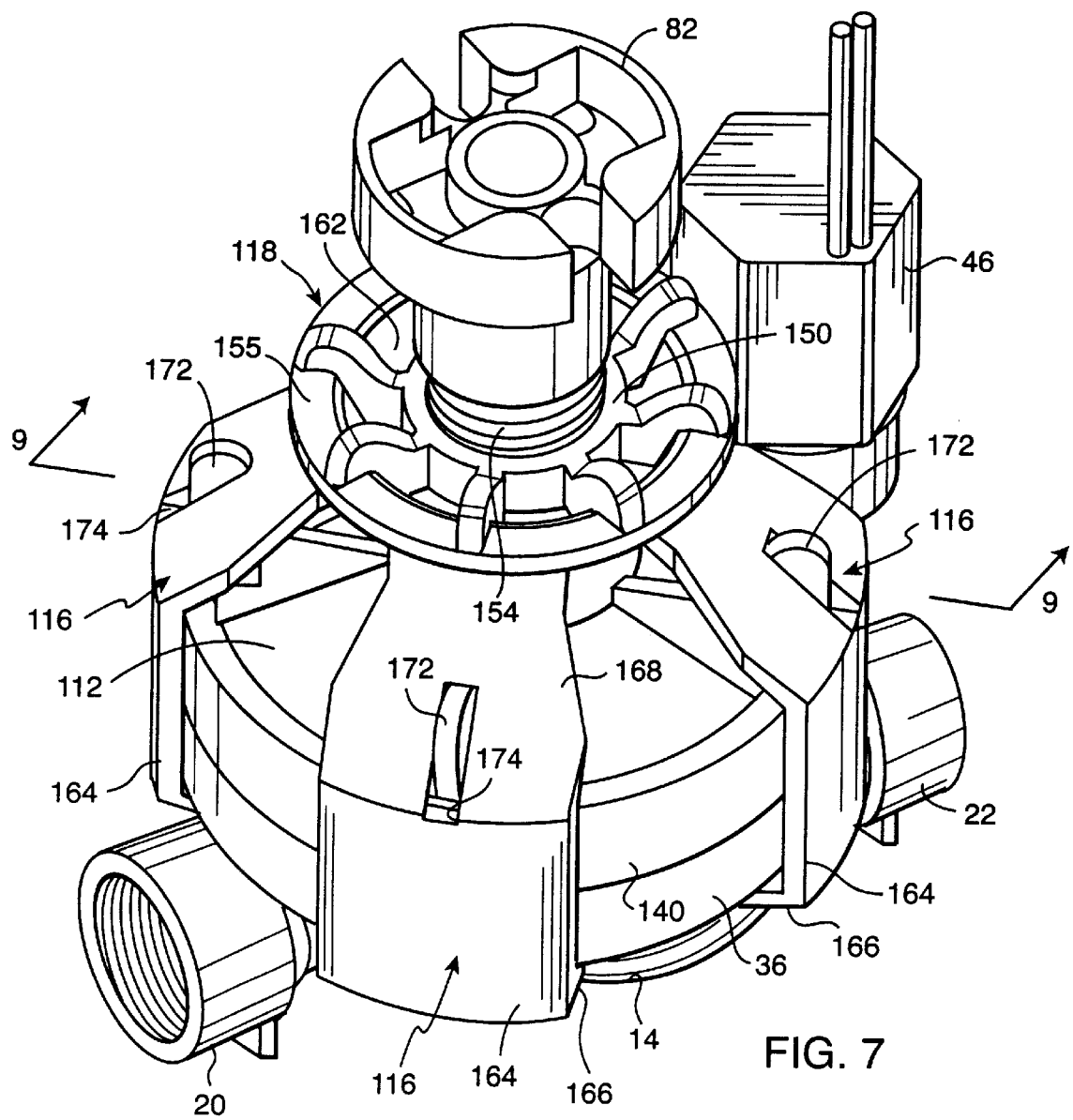
FIG. 7 is a perspective view of a solenoid actuated valve assembly including a clamp on housing bonnet embodying one alternative preferred form of the invention.
Figure 8:
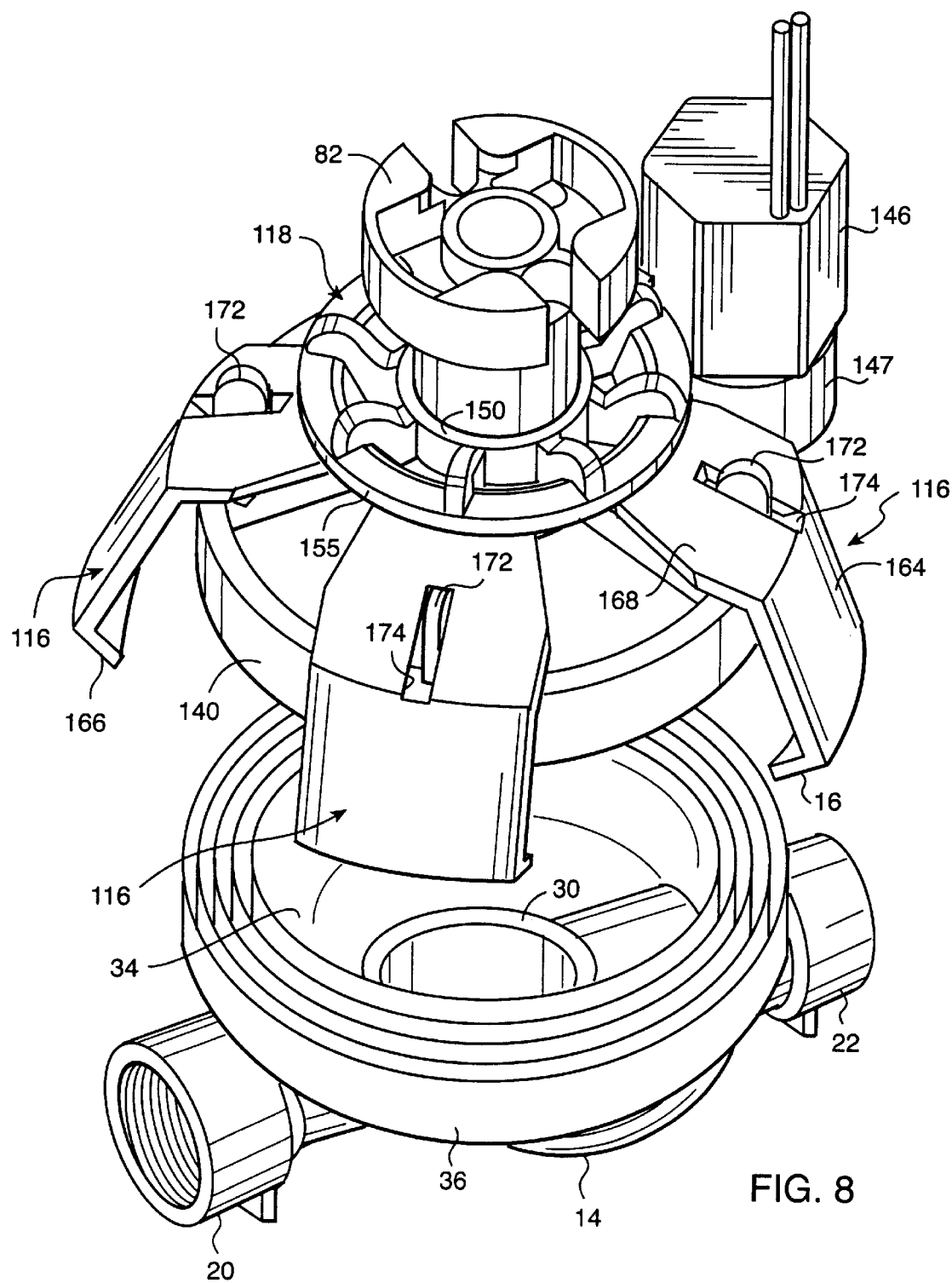
FIG. 8 is a partially exploded perspective view of the valve assembly of FIG. 7, and illustrating disengagement or disassembly of the housing bonnet from a main valve body.
Figure 9:
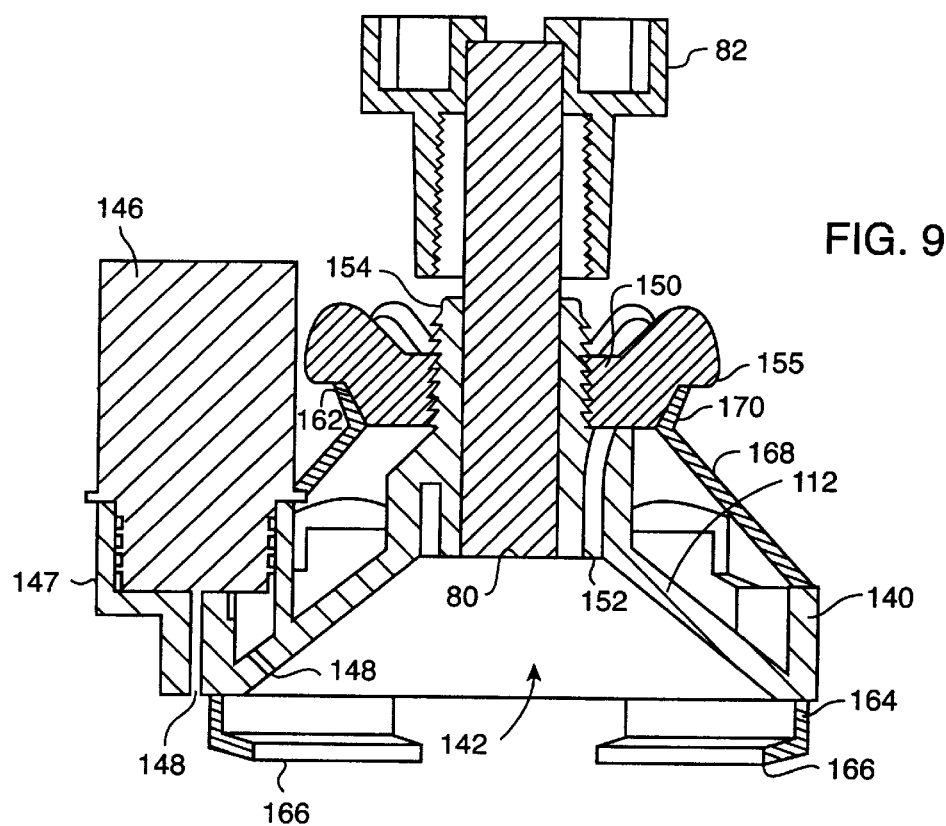
FIG. 9 is a longitudinal vertical section view taken generally on the line 9—9 of FIG. 7, and illustrating the clamp on bonnet and related clamp members for assembly with the main valve body.
Figure 10:
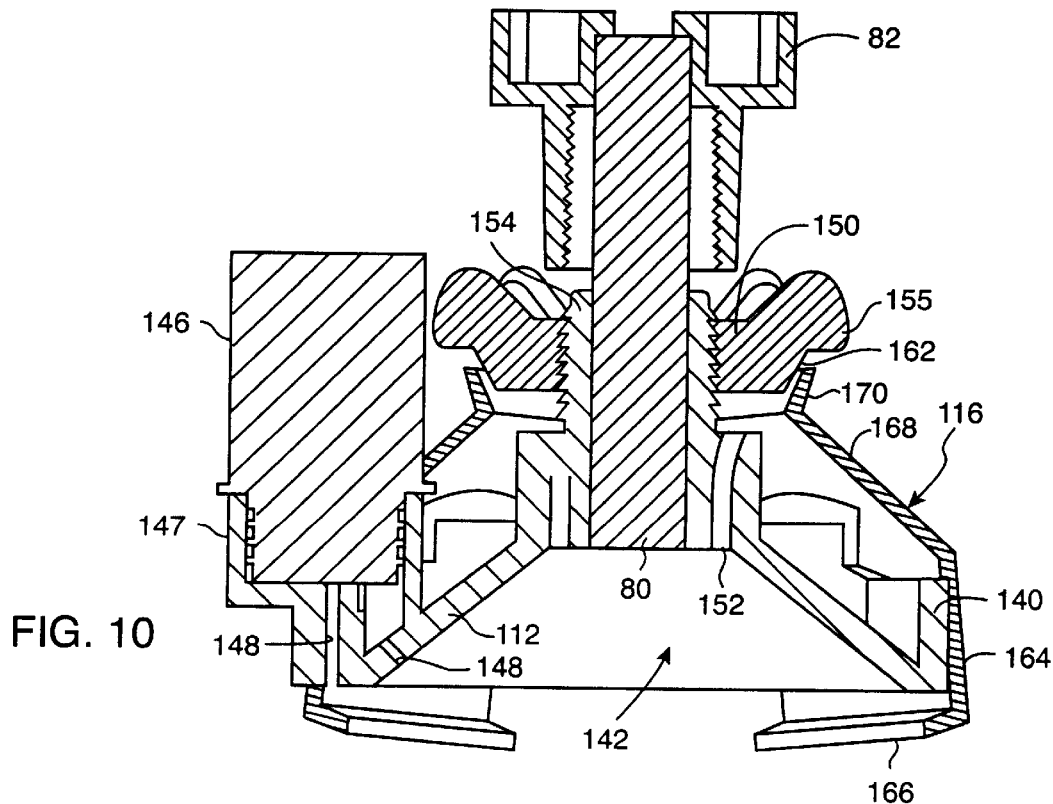
FIG. 10 is a longitudinal vertical sectional view similar to FIG. 9, and showing retraction of a retainer nut to permit clamp member disengagement or disassembly from the main valve body.
Figure 11:
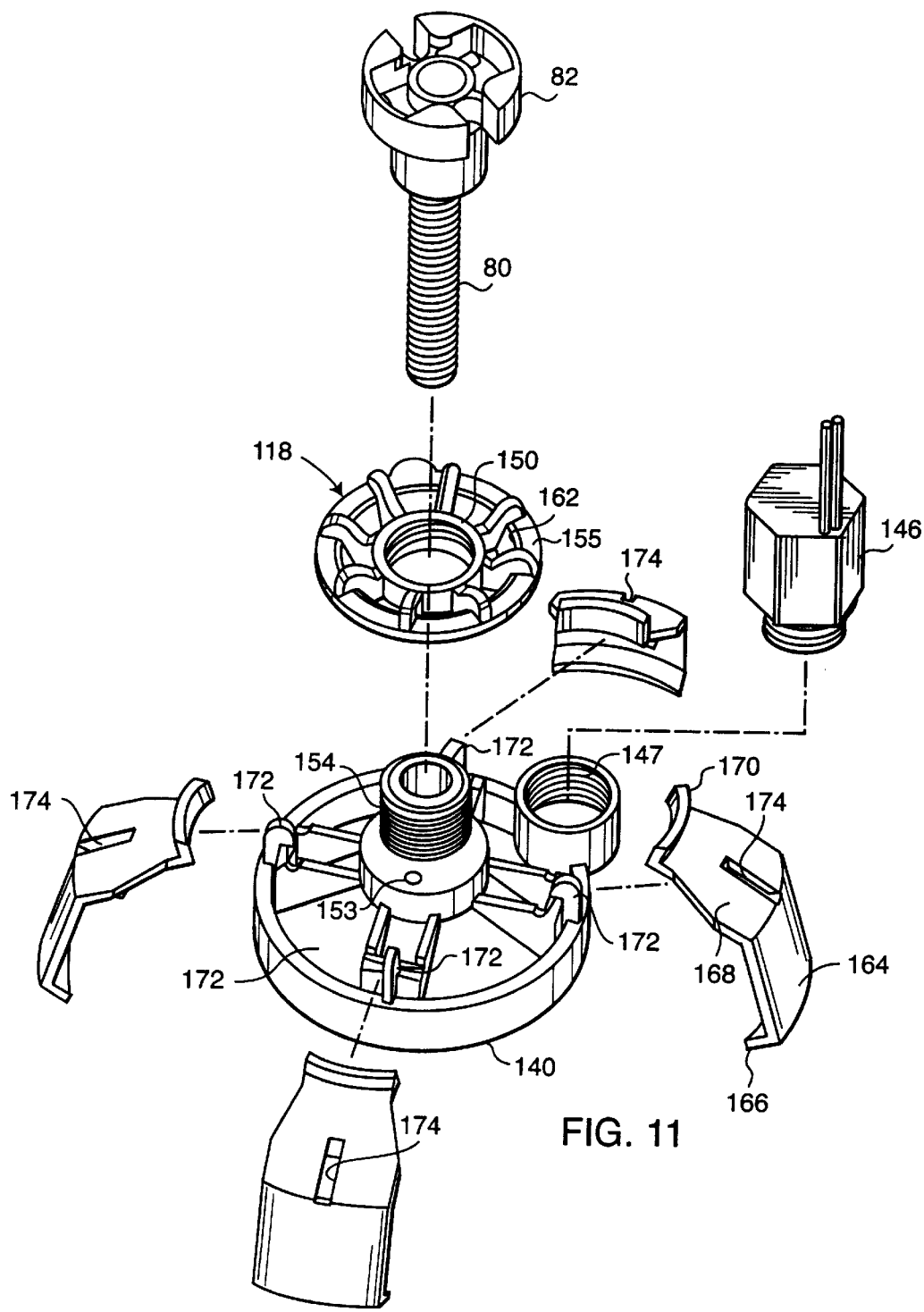
FIG. 11 is an exploded perspective view showing the housing bonnet of FIGS. 7–10 and related clamp members for removably engaging and retaining the bonnet.
Figure 12:
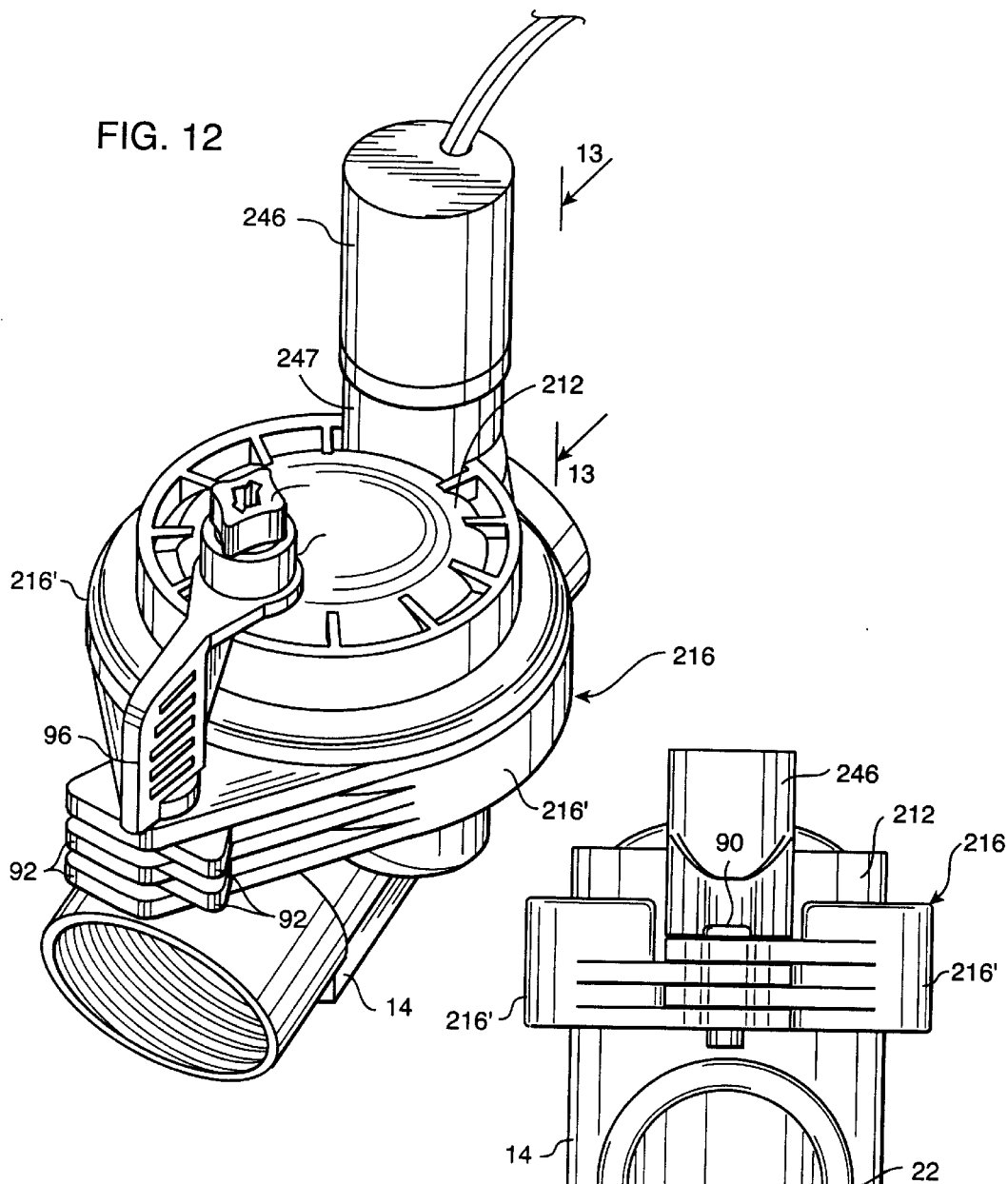
FIG. 12 is a perspective view of another solenoid actuated valve assembly including a clamp on housing bonnet embodying a further alternative preferred form of the invention.
Figure 13:
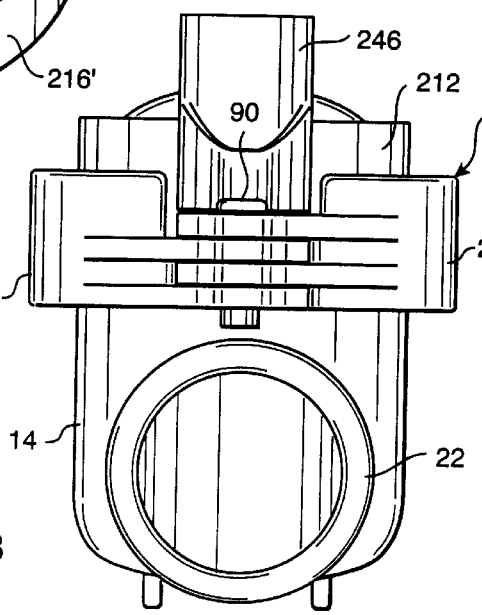
FIG. 13 is an end elevation view of the valve assembly of FIG. 12, taken generally on the line 13—13 of FIG. 12.

More particularly, the modified upper bonnet 112 has a generally dome-shaped configuration similar to the bonnet 12 shown and described with respect to the embodiment of FIGS. 1–6, to extend upwardly and inwardly from a lower peripheral rim 140 having a size and shape for clamp-fit assembly onto the upper flange 36 of the main valve body 14 (FIGS. 7–8). Accordingly, when assembled with the valve body 14 and the associated resilient diaphragm 38 with valve member 32 mounted thereon (not shown in FIGS. 7–11), the bonnet 112 cooperates with the diaphragm to define a pressure control chamber 142 (FIGS. 910) at the underside of the bonnet. A solenoid actuator 146 is mounted on the bonnet 112 within a threaded socket 147 or the like and is operated in the same manner as described with respect to FIGS. 1–6 for opening and closing the valve member to control water flow through the valve assembly. The lock nut 150 is internally threaded for mounting onto an externally threaded upstanding sleeve or boss 154 at the top of the bonnet 112 in a normal position closing and sealing a bleed port 152 formed in the bonnet. The lock nut 150 thus functions as a bleed screw and can be threadably retracted on the boss 154 sufficiently to open the bleed port 152 for purging air from the control chamber 142, all as previously described with respect to FIGS. 1–6. In addition, FIGS. 7–11 show a threaded control shaft 80 mounted within the threaded boss 154, wherein this control shaft 80 includes an upper handle 82 to permit advancement of the control shaft 80 in a downward direction into the control chamber 142 for purposes of manually closing the valve member 32, or alternately for providing a limit stop for the valve member 32 in the open position.

A plurality of vertically oriented and upstanding mounting tabs 172 are formed on the upper surface of the bonnet 112, wherein the illustrative drawings show four of these mounting tabs 172 positioned above the lower bonnet rim 40 at approximate 90° intervals. These mounting tabs 172 are each sized and shaped to protrude upwardly through a correspondingly sized and generally vertically oriented mounting slot 174 formed in an associated one of the plurality of clamp members 116. Each of these clamp members comprises a lower part-cylindrical outer shell segment 164 joined at its lower end to a radially inwardly projecting lock foot 166. The upper end of this outer shell segment 164 is joined with an upwardly and radially inwardly angled upper shell segment 168 having the associated mounting slot 174 formed therein, and terminating in turn at its upper end in an upwardly and radially outwardly extending cam segment 170. When mounted onto the bonnet 112 and the underlying main valve body 14 (FIG. 7), the tab 172 and slot 174 interconnection between each clamp member 116 and the bonnet 112 defines an open-sided hinge which permits pivoting motion of the lower lock foot 166 to a position engaging and underlying the flange 36 on the main valve body 14. The lower shell segment 164 extends about the valve body flange 36 and the bonnet rim 140, with the upper shell segment 168 extending upwardly in overlying relation to the bonnet 112 and terminating at the upper cam segment 170 adjacent the threaded boss 154.

The lock nut 150 is threadably mounted onto the boss 154 and includes an angularly upwardly and radially outwardly tapered cam shoulder 162 which merges with a peripheral outer margin or cap 155 for engaging and retaining the clamp members 116 on the bonnet 112. In particular, the tapered cam shoulder 162 of the lock nut 150 prevents radially inward displacement of the upper cam segment 170 of each clamp member 116 to correspondingly prevent outward pivoting of the lower lock foot 166 from the valve body flange 36. In addition, the outer cap 155 of the lock nut 150 prevents lift-off separation of each clamp member 116 from the associated mounting tab 172 on the bonnet. Accordingly, the lock nut 150 securely engages and locks each clamp member 116 in a position with the lower lock foot 166 thereof engaged beneath the flange 36 of the lower valve body 14, to retain the bonnet 112 and the valve body 14 in a secure and fully assembled relation.

If and when disassembly of the bonnet 112 from the valve body 14 is desired, the lock nut 150 can be sufficiently unthreaded or removed relative to the boss 154 (as viewed in FIG. 10), without the use of tools, to permit radially inward displacement of the upper cam segment 170 of each clamp member 116. This inward cam segment displacement is accompanied by radially outward displacement of the associated lock foot 166 sufficient to disengage from the flange 36 of the main valve body 14, whereupon the clamp member 116 can be quickly and easily lift-off removed from the assembled valve body 14 and bonnet 112. As in the prior embodiment, in a preferred method, the lock nut 150 is partially unthreaded within the boss 154 sufficient to permit disengagement of the lock foot 166 on each clamp member 116 from the valve body flange 36, with the interconnected slot 174 and tab 172 pivotally retaining each clamp member on the bonnet 112. Alternately, if desired, the lock nut 150 can be removed from the boss 154 to permit clamp member separation from the bonnet. In either case, the clamp member lock feet 166 are disengaged from the main valve body 14 to permit the bonnet 112 to be separated from the lower valve body 14 by simple lift-off movement to expose the valve assembly interior for service or maintenance. Importantly, initial unthreading movement of the lock nut 150 opens the bleed port 152 to vent the control chamber with resultant fluid discharge in the event that the water supply has not been turned off at an upstream location.

A further alternative preferred form of the invention is shown in FIGS. 12–15, wherein a ring clamp 216 is provided for removably retaining an upper bonnet 212 in assembled relation with a lower or main valve body 14 of the type shown and described previously herein. The ring clamp 216 circumferentially surrounds the assembled valve housing components to engage and retain a peripheral rim 240 on the bonnet 212 in overlying relation with the radially outwardly projecting flange 36 on the main valve body 14, and thereby removably and securely retain the valve housing components in assembled relation. In addition, the upper bonnet 212 cooperates with the lower valve body 14 to support the valve member (not shown in FIGS. 12–15) for opening and closing movement relative to the valve seat 30. A solenoid actuator 246 is mounted on the bonnet 212 within a threaded socket 247 or the like and is adapted for remote activation as previously described, for controlling the open or closed position of the valve member relative to the valve seat. Again, for ease and clarity of description, structural components corresponding in function to those shown and described in FIGS. 1–6 are referred to by common reference numerals increased by 200.

Figure 14:
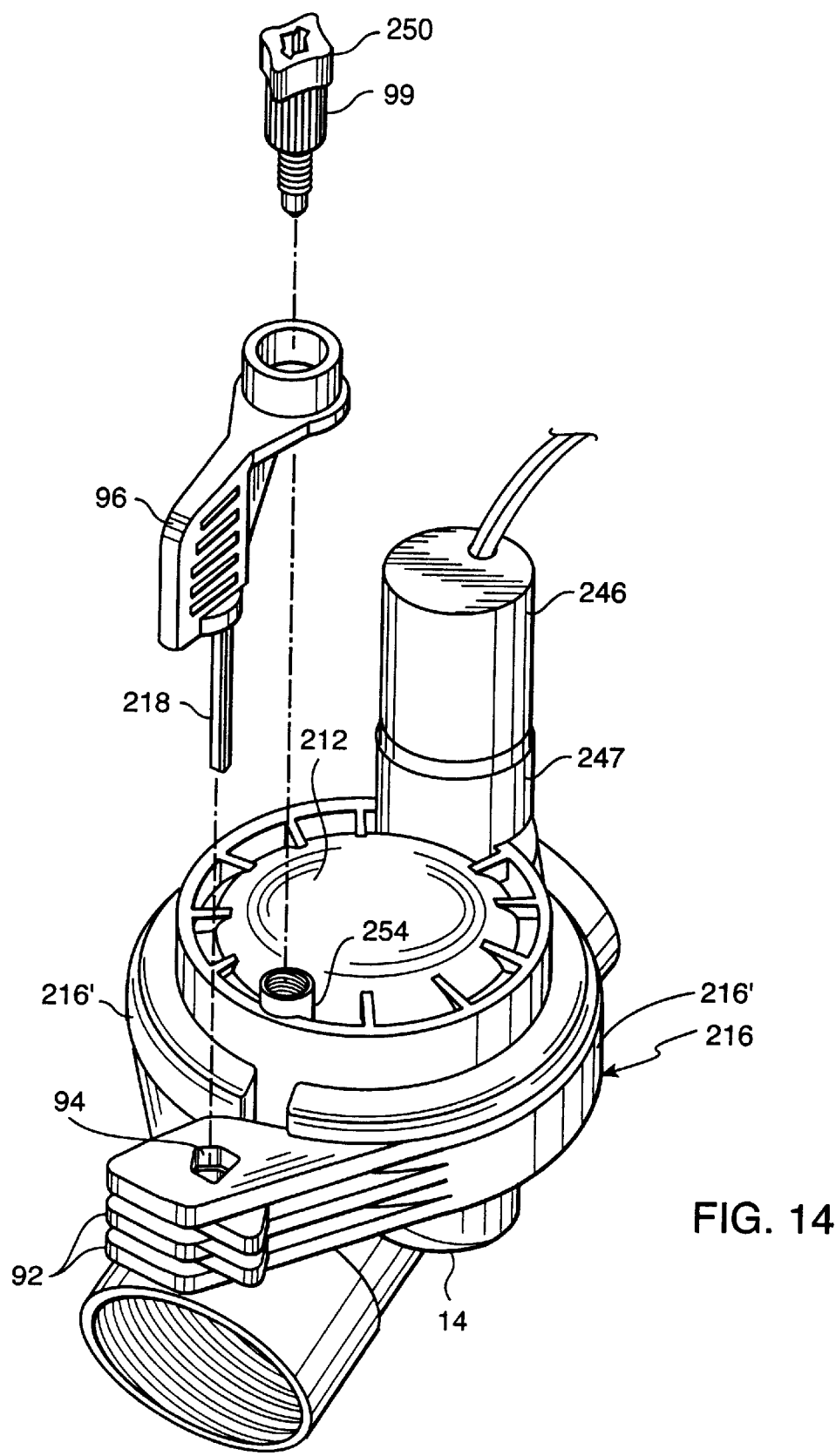
FIG. 14 is a partially exploded perspective view of the valve assembly of FIG. 12, and depicting initial steps for disassembly of the housing bonnet from a main valve body.
Figure 15:
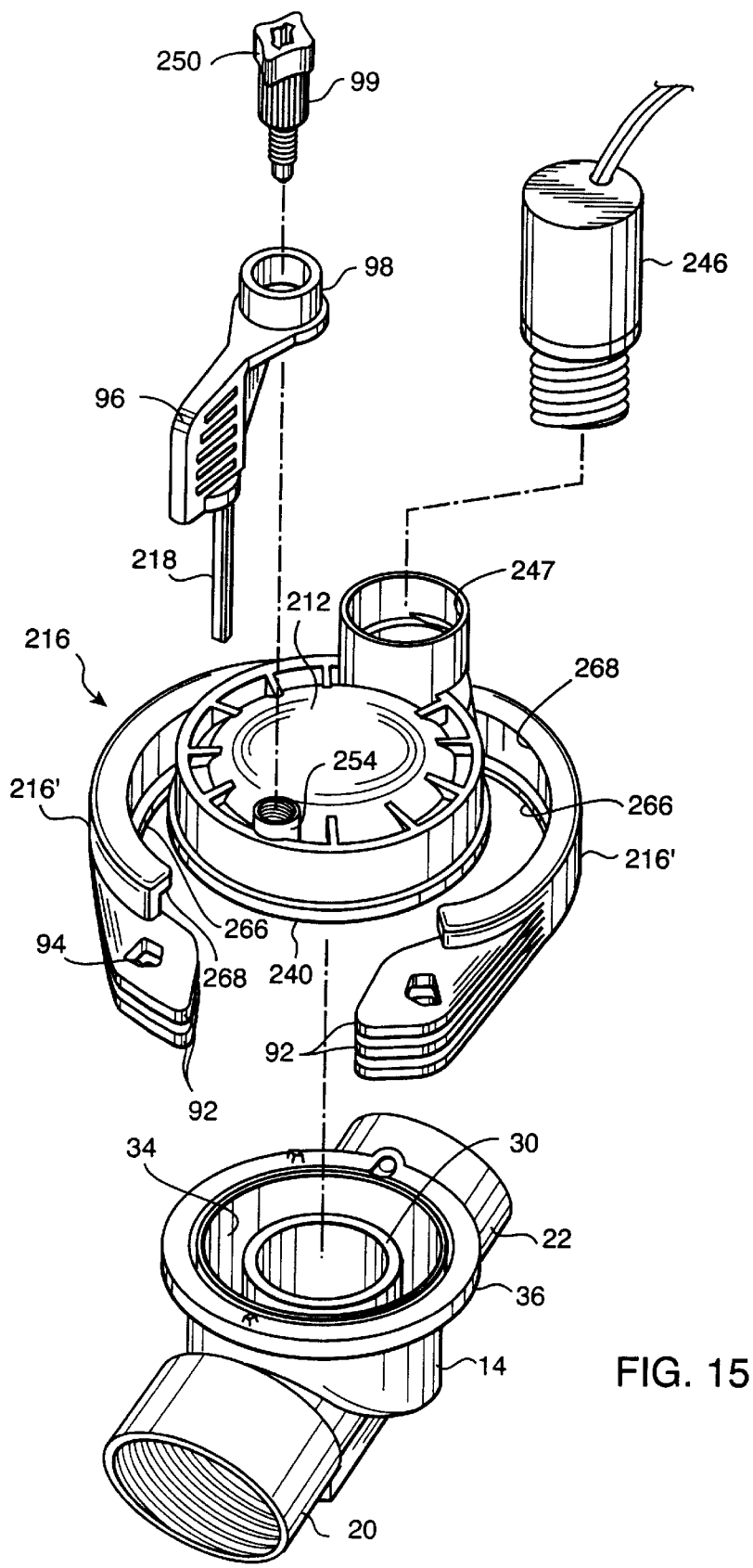
FIG. 15 is an exploded perspective view of the valve assembly of FIG. 12.

As shown best in FIGS. 14–15, the ring clamp 216 comprises a pair of generally C-shaped clamp members 216' pivotally attached to each other at one end by a hinge pin 90, and having a size and shape to wrap closely about the outer flange 36 on the main valve body 14 and the overlying peripheral rim 240 on the upper bonnet 212. In a preferred form, the hinge pin 90 is connected to or formed integrally with the bonnet 212, so that the hinge pin 90 pivotally attaches the two clamp members 216' to the bonnet. These clamp members 216' each include a lower lock rib 266 (FIG. 15) for closely underlying and engaging the valve body flange 36, and an upper lock rib 268 for closely overlying and engaging the bonnet rim 240, thereby retaining the flange 36 and the overlying bonnet rim 240 in dose-fitting clamped relation. The free ends of the clamp members 216' each include a plurality of fingers 92 adapted to interfit in an interleaved relation (FIGS. 12 and 14–15) when the clamp members 216' are closely wrapped about the assembled valve components, and these fingers 92 include vertically open retainer ports 94 which are adapted when vertically aligned to receive a retainer element in the form of a retainer pin 218 there through. In a preferred form as shown best in FIGS. 14–15, the retainer pin 218 has an elongated pin shaft with a noncircular cross section, and the retainer ports 94 in the clamp fingers 92 also have a noncircular cross sectional shape, whereby the retainer pin 218 can be inserted into the retainer ports 94 and then rotated through a part-circular stroke to draw the clamp members 216' tightly against the assembled valve housing components with a camming action.

An upper end of the retainer pin 218 includes an enlarged tab 96 for facilitated manipulation thereof. A lock sleeve 98 is formed at one side of this tab 96 for alignment with an upstanding and internally threaded boss 254 formed on the bonnet 212 and having a bleed port (not shown in FIGS. 12–15) formed therein. A bleed screw 250 is provided for thread-in mounting into this boss 254 for normally closing the bleed port; retraction of the bleed screw relative to the boss 254 opens the bleed port for purging fluid such as air from the underlying control chamber, as previously described with respect to FIGS. 1–6. The bleed screw 250 includes an upper unthreaded shank portion 99 for reception through the lock sleeve 98 to lock the retainer pin 218 in a position holding the clamp members 216' in secure clamped engagement upon the valve housing components, when the bleed screw 250 is seated within the threaded boss 254.

Disassembly of the valve housing components is accomplished quickly and easily, and without the use of tools, by initially removing the bleed screw 250 from the associated threaded boss 254. This initial removal of the bleed screw 250 will be accompanied by discharge of water via the bleed port, in the event that the water supply has not previously been turned off at a suitable upstream location. Assuming that the water supply has been turned off, bleed screw removal permits the retainer pin 218 to be manually separated from the clamp members 216', to permit the clamp members to be pivoted outwardly and away from the valve housing components. Such separation of the clamp members 216' accommodates simple lift-off separation of the upper bonnet 212 from the lower valve body 14 for access to the valve interior. Re-assembly occurs quickly and easily, and in a reverse sequence, by re-mounting the clamp members 216' on the re-assembled valve housing components, and then re-installing the retainer pin 218 followed by re-installation of the bleed screw 250.

Accordingly, the improved valve assembly of the present invention provides quick and easy clamp on mounting of an upper bonnet to a lower or main valve body. This clamp on mounting arrangement retains the housing components in securely assembled relation for normal operation to control fluid flow, such as the supply of irrigation water to a plurality of irrigation sprinkler devices or the like. However, the clamp on mounting arrangement is adapted for quick and easy disassembly without requiring the use of tools, to accommodate convenient access to the interior of the valve assembly for service and/or maintenance procedures. In each embodiment, the clamp members may be retained in the normal clamp-mount position by a retainer element which comprises or is coupled to a bleed screw element utilized for purging fluid such as air from the valve assembly. With this construction, initial disassembly steps require retraction of the bleed screw element sufficiently to purge fluid from the valve assembly, whereby fluid will be discharged via a bleed port in the event that the water supply to the valve assembly has not been properly turned off at an upstream location.

A variety of further modifications and improvements in and to the present invention will be apparent to those persons skilled in the art. Accordingly, no limitation on the invention is intended by way of the foregoing description and accompanying drawings, except as set forth in the appended claims.

What is claimed is:

1. A valve assembly, comprising:

first and second valve housing components adapted for assembly with each other, said valve housing components in assembled relation defining an internal flow path extending between an inlet and an outlet, and further including a valve member mounted along said flow path and movable between open and closed positions for regulating fluid flow from said inlet to said outlet;

at least one clamp member for removable mounting onto said first and second valve housing components to retain said components in assembled relation; and a retainer element for engaging and locking said at least one clamp member in a position retaining said valve housing components in assembled relation, said retainer element being movable to a position sufficiently disengaged from said clamp member to permit movement of said clamp member to a position permitting separation of said first and second valve housing components.

2. The valve assembly of claim 1 wherein said retainer element is movable without tools to the position disengaged from said clamp member.

3. The valve assembly of claim 1 wherein said at least one clamp member comprises a plurality of clamp members.

4. The valve assembly of claim 1 wherein said retainer element comprises a threaded member removably mounted on said first valve housing component.

5. The valve assembly of claim 1 wherein said second valve housing component comprises a main valve body defining said inlet and said outlet, and a valve seat surrounding a valve port disposed along said flow path, and further wherein said first valve housing component comprises a bonnet removably mounted onto said main valve body, said valve member being movably positioned between said bonnet and said valve seat for movement between said open and closed positions relative to said valve seat.

6. The valve assembly of claim 5 further including a resilient diaphragm movably carrying said valve member, said bonnet and said diaphragm cooperatively defining a control chamber within said valve assembly, and further including means for regulating fluid pressure within said control chamber for displacing said valve member between said open and closed positions.

7. The valve assembly of claim 6 wherein said bonnet has a bleed port formed therein for purging fluid from said control chamber, said retainer element being movably mounted on said bonnet for opening said bleed port upon movement to said position disengaged from said clamp member.

8. The valve assembly of claim 6 wherein said retainer element comprises a threaded bleed screw element for threaded mounting onto said bonnet in a position closing said bleed port and engaging said clamp member for removably locking said clamp member in a position retaining said bonnet and said main valve body in assembled relation.

9. The valve assembly of claim 8 wherein said threaded bleed screw element comprises a bleed screw.

10. The valve assembly of claim 8 wherein said threaded bleed screw element comprises a threaded nut.

11. The valve assembly of claim 1 wherein said at least one clamp member is pivotally mounted on one of said first and second valve housing components for movement between a first position retaining said valve housing components in assembled relation and a second position permitting lift-off separation of said clamp member from said valve housing components, said retainer element removably locking said clamp member in said first position.

12. The valve assembly of claim 11 wherein said first valve housing component includes a peripheral rim overlying a peripheral flange on said second valve housing component when said first and second valve housing components are in assembled relation, said at least one clamp member engaging and retaining said rim and flange in clamped relation when said clamp member is in said first position.

13. The valve assembly of claim 1 wherein said first valve housing component includes a peripheral rim overlying a peripheral flange on said second valve housing component when said first and second valve housing components are in assembled relation, and further wherein said at least one clamp member comprises a circumferential clamp for engaging and retaining said rim and flange in clamped relation.

14. The valve assembly of claim 13 wherein said circumferential clamp comprises a pair of generally C-shaped clamp members pivotally interconnected to each other at one end, said retainer element releasibly engaging and locking the opposite ends of C-shaped clamp members relative to one of said first and second valve housing components to retain said valve housing components in assembled relation.

15. A valve assembly, comprising:
a main valve body defining an internal flow path extending between an inlet and an outlet, and further defining a valve seat surrounding a valve port formed along said flow path, said main valve body having an opening formed therein at a location between said inlet and said outlet to expose said valve seat;
a bonnet having a size and shape for removable mounting onto said main valve body to extend over and close said opening;
a valve member carried between said main valve body and said bonnet for movement between open and closed positions relative to said valve seat for regulating fluid flow from said inlet to said outlet;
at least one clamp member for removably retaining said bonnet in assembled relation mounted onto said main valve body; and
a retainer element for engaging and locking said at least one clamp member in a position retaining said bonnet and said main valve body in assembled relation, said retainer element being movable to a position sufficiently disengaged from said clamp member to permit movement of said clamp member to a position permitting lift-off separation of said clamp member from said bonnet and said main valve body.

16. The valve assembly of claim 15 wherein said retainer element is movable without tools to the position disengaged from said clamp member.

17. The valve assembly of claim 15 wherein said at least one clamp member comprises a plurality of clamp members for removably retaining said bonnet and said main valve body in assembled relation.

18. The valve assembly of claim 15 wherein said retainer element comprises a threaded member removably mounted on said bonnet.

19. The valve assembly of claim 15 further including a resilient diaphragm movably carrying said valve member, said bonnet and said diaphragm cooperatively defining a control chamber within said valve assembly, and further including means for regulating fluid pressure within said control chamber for displacing said valve member between said open and closed positions.

20. The valve assembly of claim 19 wherein said bonnet has a bleed port formed therein for purging fluid from said control chamber, said retainer element being movably mounted on said bonnet for opening said bleed port upon movement to said position disengaged from said clamp member.

21. The valve assembly of claim 20 wherein said retainer element comprises a threaded bleed screw element for threaded mounting onto said bonnet in a position closing said bleed port and engaging said clamp member for removably locking said clamp member in a position retaining said bonnet and said main valve body in assembled relation.

22. The valve assembly of claim 15 wherein said at least one clamp member is pivotally mounted on said bonnet for movement between a first position retaining said bonnet and said main valve body in assembled relation and a second position permitting lift-off separation of said clamp member from said bonnet, said retainer element removably locking said clamp member in said first position.

23. The valve assembly of claim 22 wherein said bonnet includes a peripheral rim overlying a peripheral flange on said main valve body when said bonnet and main valve body are in assembled relation, said at least one clamp member engaging and retaining said rim and flange in clamped relation when said clamp member is in said first position.

24. The valve assembly of claim 15 wherein said bonnet includes a peripheral rim overlying a peripheral flange on said main valve body when said bonnet and main valve body are in assembled relation, and further wherein said at least one clamp member comprises a circumferential clamp for engaging and retaining said rim and flange in clamped relation.

25. The valve assembly of claim 24 wherein said circumferential clamp comprises a pair of generally C-shaped clamp members pivotally interconnected to each other at one end, said retainer element releasibly engaging and locking the opposite ends of C-shaped clamp members relative to bonnet to retain said bonnet and main valve body in assembled relation.

26. A valve assembly, comprising:
- a main valve body defining an internal flow path extending between an inlet and an outlet, and further defining a valve seat surrounding a valve port formed along said flow path, said main valve body having an opening formed therein at a location between said inlet and said outlet to expose said valve seat;
- a bonnet having a size and shape for removable mounting onto said main valve body to extend over and close said opening;
- a resilient diaphragm carrying a valve member for movement between open and closed positions relative to said valve seat for regulating fluid flow from said inlet to said outlet, said bonnet and said diaphragm cooperatively defining a pressure control chamber within said valve assembly;
- means for controlling fluid pressure within said control chamber for displacing said valve member between said open and closed positions;
- said bonnet having a bleed port formed therein for bleeding fluid from said control chamber;
- at least one clamp member for removably retaining said bonnet in assembled relation mounted onto said main valve body; and
- retainer means movable between a first position for engaging and locking said at least one clamp member in a clamped position retaining said bonnet and said main valve body in assembled relation, and a second position permitting movement said at least one clamp member to an unclamped position to permit lift-off separation of said bonnet and said main valve body;
- said retainer means closing said bleed port in said first position, and opening said bleed port in said second position.

27. The valve assembly of claim 26 wherein said retainer element is movable without tools between said first and second positions.

28. The valve assembly of claim 26 wherein said at least one clamp member comprises a plurality of clamp members for removably retaining said bonnet and said main valve body in assembled relation.

29. The valve assembly of claim 26 wherein said retainer element comprises a threaded member removably mounted on said bonnet.

30. The valve assembly of claim 26 wherein said bonnet includes a peripheral rim overlying a peripheral flange on said main valve body when said bonnet and main valve body are in assembled relation, said at least one clamp member engaging and retaining said bonnet rim and said valve body flange in clamped relation against each other, and said retainer means in said first position engaging and locking said clamp member with respect to said bonnet.

31. The valve assembly of claim 30 wherein said at least one clamp member comprises a pair of clamp members engaging and retaining said bonnet rim and said valve body flange in clamped relation against each other generally at opposite sides of the valve assembly.

32. The valve assembly of claim 30 wherein said at least one clamp member comprises a plurality of clamp members mounted in spaced relation about the periphery of the valve assembly.

33. The valve assembly of claim 30 wherein said retainer means comprises a bleed screw.

34. The valve assembly of claim 30 wherein said retainer means comprises a bleed nut.

35. The valve assembly of claim 30 wherein said at least one clamp member comprises a ring clamp.

36. The valve assembly of claim 35 wherein said retainer means comprises a retainer pin for retaining said ring clamp in a position retaining said bonnet and main valve body in assembled relation, and a bleed screw movably mounted on said bonnet for opening and closing said bleed port, said retainer pin and said bleed screw including interengaging means for locking said retainer pin in engagement with said ring clamp when said bleed screw is in said first position closing said bleed port.

\* \* \* \* \*